(No Model.)
W. S. OVENS.
Cake Machine.
No. 230,431.  Patented July 27, 1880.
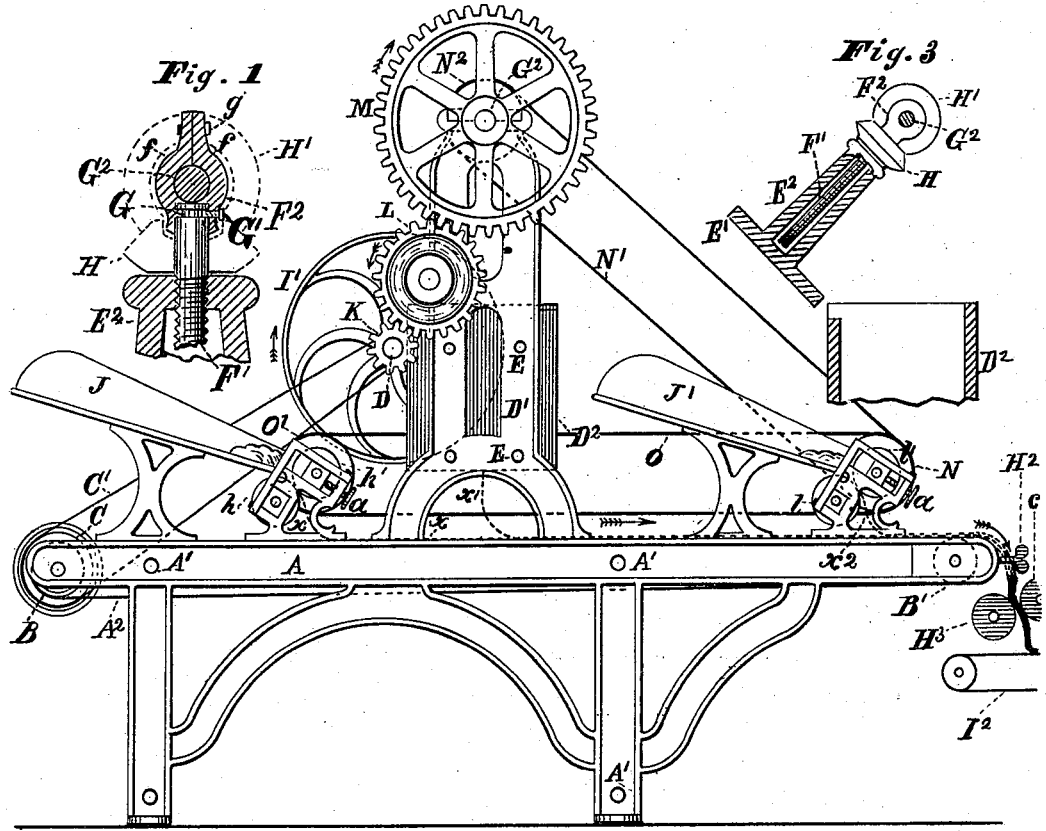
Witnesses
Inventor
Walter S. Ovens.
By James Sangster
Atty.

UNITED STATES PATENT OFFICE.

WALTER S. OVENS, OF BUFFALO, NEW YORK.

CAKE-MACHINE.

SPECIFICATION forming part of Letters Patent No. 230,431, dated July 27, 1880.

Application filed June 4, 1880. (No model.)

*To all whom it may concern:*

Be it known that I, WALTER S. OVENS, a citizen of the United States, residing in the city of Buffalo, in the county of Erie and State of New York, have invented certain new and useful Improvements in Fruit-Cake, Biscuit, or Cracker Machines, of which the following is a specification.

The object of my invention is to provide a cheap and rapid means for interposing a layer of fruit or fruit paste between two layers of other material forming the cake or biscuit; and it consists of an endless belt or apron provided with the usual means for giving it its proper movements, a pair of rollers adapted for rolling out a thin sheet of the first layer of cake material and depositing it upon the said belt or apron, in combination with a fruit-box provided with a long narrow opening at the bottom and a piston or plunger for forcing the fruit out in a thin layer upon the first layer of cake material, which is carried along under it by the endless belt or apron, and a second pair of rollers adapted for rolling out a second layer of cake material and depositing it upon the layer of fruit, which is carried by the endless apron forward as fast as it comes from the rollers, thereby producing a sheet of fruit-cake material composed of three layers—first, a layer of fruit-cake material; second, a layer of fruit or fruit paste; third, a layer of cake or cracker material. The three layers, after being thus united, may, if required, be passed through an ordinary cracker-machine and cut up into cakes or crackers of various sizes or shapes, or made into rolls, as will be more clearly hereinafter shown by reference to the drawings, in which—

Figure 1 is an enlarged portion, partly in section, of the machine, showing the manner of connecting the screw for the fruit-box piston or plunger to the shaft which operates it. Fig. 2 is a side elevation of the machine complete; Fig. 3, an enlarged view, partly in section, of the piston or plunger, showing the screw and a diagram of the bevel-gearing by which it is operated, also a cross-section through a portion of the fruit-box, the whole showing the position of the plunger when swung out of the way so as to leave an opening to put in the fruit or clean out the box. Fig. 4 is a plan view of the machine; Fig. 5, a cross-section through of the fruit-box and plunger; and Fig. 6 represents an enlarged vertical section through a portion of the product of the machine.

A represents the frame of the machine. It is made preferably of cast-iron, as being the cheapest and strongest material, and is held together by the usual binding-rods $A'$. $A^2$ is the endless apron, arranged, in the usual way, on rollers B $B'$. It receives its proper movements by means of the pulley C, belt $C'$, and pulley $C^2$ on the driving-shaft D, the upper side moving in the direction of the arrows. To the frame A is bolted, in the usual way, the vertical frames $D'$, between which the fruit-box $D^2$ is securely fastened by bolts E, about five or six inches above the endless apron.

$E'$ is the plunger, to which is attached a hollow column, $E^2$, either cast in one piece with it, as shown in Fig. 3, or bolted to it by bolts F, as shown in Fig. 5. Through the top of the column $E^2$ the screw-rod $F'$ passes, and is fitted so as to screw in or out, (see Fig. 1,) and is held up in a box, $F^2$, by means of a groove, G, in its upper end (see Fig. 1) and one or more set-screws, $G'$. The said box $F^2$ is made in two parts, $ff$, as shown in Fig. 1, and is held securely to the shaft $G^2$ by means of one or more bolts, $g$. It is fitted so that the shaft $G^2$ can turn easily within it. To the screw-rod $F'$ is rigidly fastened a bevel-gear wheel, H, and to the shaft $G^2$ is also connected a similar wheel, $H'$, which gears into H.

It will be seen that a movement of the shaft $G^2$ will, through the gearing H $H'$, cause the screw-rod $F'$ to turn and thereby move the plunger $E'$ up or down, according to the direction in which it may be turned. When the plunger is at the limit of its upward movement and it is desired to either fill or clean the fruit-box, it is swung out so that it passes to the front of the box $D^2$, the shaft $G^2$ acting as a support upon which it swings. (See Fig. 3.)

The first pair of rollers are represented by the letters $h\ h'$. They are geared together in the usual way by gear-wheels $e\ e'$. (Shown in Fig. 4.

J represents an inclined platform upon which the dough is placed to be fed between the rollers.

$l\ l'$ is the second pair of rollers, and $J'$ the inclined platform upon which the dough is placed to be fed into them. They are also geared together by gear-wheels $e^2\ e^3$. (Shown in Fig. 4.)

The upper roller, $l'$, is provided with a wide face-pulley, N, which pulley is connected by a belt, $N'$, to a pulley, $N^2$, on the shaft $G^2$, which, when in motion, imparts the necessary rotary movement to the rollers $l\ l'$. The rollers $h\ h'$ receive a similar motion from the pulley N (the face of which is wide enough for two belts) and the belt O and a pulley, $O'$, on the shaft of roller $h'$.

The bevel-wheel $H'$ is arranged to turn loosely on the shaft $G^2$ when not engaged with the clutch Q. (Shown in Fig. 4.) It is made in the usual way, and is kept from turning on the shaft $G^2$ by a feather. P represents handle by which it is operated.

The object of the clutch is to provide the means for either starting or stopping the fruit-box plunger, and thereby controlling its operation without interfering with the operation of the rest of the machinery.

At the bottom of the fruit-box $D^2$ is a long narrow opening, V, arranged lengthwise of the box, which opening is made adjustable in width, or may be closed when it is necessary by means of the plate I, which is held to the bottom of the box D by screws or bolts $i'$, so as to allow it to be moved to or from the plate I by means of one or more screws R.

$H^2$ in Fig. 2 represents one of the ordinary thumb-nuts for tightening the endless apron.

The operation of my invention is as follows: The dough placed on the platform J is formed into a sheet (shown by dotted lines $x$ in Fig. 2) as it passes through the rollers $h\ h'$, and is carried along under the fruit-box. The fruit, prepared in the usual way so as to form a paste of sufficient firmness, being placed in the box $D^2$, is now started by means of the clutch heretofore mentioned, which causes the gearing $H'\ H$ to force the plunger $E'$ down into the box and force out a thin sheet of the fruit (shown by dotted lines $x'$, Fig, 2) down on the sheet of dough $x$, and as the apron carries the two sheets $x\ x'$ along they pass under the rollers $l\ l'$, when another sheet of dough (see dotted lines $x^2$ in Fig. 2) is laid upon the fruit, thereby completing the fruit-cake material, as before mentioned, the movements of all parts of the machine being so timed that the three sheets are laid evenly and smoothly together.

The completed fruit-sheet may be rolled up into an ordinary rolled cake, or it may be passed through a common cracker-machine, through the rollers $H^3$ and $c$, (shown in Fig. 2,) and through the machine, so as to be cut in the ordinary way into fruit-cakes, crackers, or biscuits.

Instead of belts for moving the rollers, the well-known gear-wheels may be used to effect the same purpose.

As a modification of my invention I would state that a pair of rollers arranged similar to $h\ h'$ and a platform or feed-box may be substituted for the fruit-box $D^2$ and used in its place when the fruit or other compound is made into paste thick enough to be passed through rollers, which rollers should move so as to roll the sheet of dough out as fast as the endless apron moves.

In some cases the two pairs of rollers $h\ h'$ and $l\ l'$ may be used without the fruit-box $D^2$— for instance, when it is desired to make cakes consisting of two sheets of dough of different colors, or in one of which finely-cut fruit has been mixed, in which case the product of the machine would consist of two layers instead of three; and when it is intended to make jelly-cake to be rolled into rolls, only the first set of rollers, $h\ h'$, and the fruit-box $D^2$ would be used.

I claim as my invention—

1. The rollers $h\ h'$, having a suitable platform or feed-box to receive the dough, and the means, substantially as described, for giving them the necessary motion, a fruit-box, $D^2$, provided with an opening, V, through the bottom, a plunger, $E'$, and its accompanying mechanism for operating it, in combination with a second pair of rollers, $l\ l'$, a platform, $J'$, and an endless apron, $A^2$, the whole combined for joint operation, whereby three sheets of cake material are made and smoothly laid together, substantially as specified.

2. In a cake-machine, two pairs of rollers, $h\ h'$ and $l\ l'$, each provided with a suitable platform or feeding-box, J or $J'$, in combination with an endless belt or apron, $A^2$, and a suitable means, substantially as specified, for giving each their proper movements, whereby two sheets of cake material are made and laid together, substantially as described.

3. The combination of the rollers $h\ h'$ and the endless apron $A^2$ with the fruit-box $D^2$ and their operating mechanism, substantially as specified, for producing a single sheet of cracker or cake material covered with a thin layer of fruit, as described.

WALTER S. OVENS.

Witnesses:
JAMES SANGSTER,
AMOS W. SANGSTER.